(12) United States Patent
Cui et al.

(10) Patent No.: US 9,887,621 B2
(45) Date of Patent: Feb. 6, 2018

(54) POWER FACTOR CORRECTION CIRCUIT AND METHOD FOR CORRECTING POWER FACTOR, CONVERTER DEVICE THEREOF

(71) Applicant: Magnachip Semiconductor, Ltd., Cheongju-si (KR)

(72) Inventors: Zhi Yuan Cui, Cheongju-si (KR); In Ho Hwang, Incheon (KR); Young Gi Ryu, Seoul (KR); Sang Hoon Jeong, Seoul (KR); Gyu Ho Lim, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 14/983,017

(22) Filed: Dec. 29, 2015

(65) Prior Publication Data

US 2016/0218616 A1    Jul. 28, 2016

(30) Foreign Application Priority Data

Jan. 22, 2015    (KR) .................. 10-2015-0010451

(51) Int. Cl.
*H02M 7/04* (2006.01)
*H02M 1/42* (2007.01)

(52) U.S. Cl.
CPC ......... *H02M 1/4225* (2013.01); *Y02B 70/126* (2013.01)

(58) Field of Classification Search
CPC .. H02M 1/4225; H02M 1/42; H02M 2/22523; Y02B 70/126

USPC ................ 323/207, 222, 211, 224, 282–289; 262/21.01, 37, 89
See application file for complete search history.

(56) References Cited

U.S. PATENT DOCUMENTS

| | | | |
|---|---|---|---|
| 6,728,121 B2* | 4/2004 | Ben-Yaakov | H02M 1/4225 323/207 |
| 7,391,630 B2* | 6/2008 | Acatrinei | G05F 1/70 363/89 |
| 8,148,956 B2* | 4/2012 | Hwang | G05F 1/70 323/207 |
| 8,320,144 B2* | 11/2012 | Lee | G05F 1/70 323/207 |
| 9,124,189 B2* | 9/2015 | Heuken | H05B 33/0818 |
| 2008/0180973 A1* | 7/2008 | Park | H02M 3/33523 363/21.01 |
| 2008/0205103 A1* | 8/2008 | Sutardja | G05F 1/70 363/84 |
| 2010/0019809 A1 | 1/2010 | Hwang et al. | |

* cited by examiner

*Primary Examiner* — Rajnikant Patel
(74) *Attorney, Agent, or Firm* — NSIP Law

(57) ABSTRACT

The present examples relate to a power factor correction device, a power factor correction method, and a corresponding converter, in which when an input signal inputted into the converter is changed, a reference signal is also changed to fit to the input signal in consideration of only the frequency and the phase of the input signal. Thus, even without a specifically designated control circuit, examples make it possible to improve power factor correction and Total Harmonic Distortion (THD) and to reduce the size of a semiconductor chip, and examples are potentially used for a device receiving waveforms other than a sine wave.

13 Claims, 2 Drawing Sheets

WAVEFORM OF SENSING VOLTAGE

POWER FACTOR CORRECTION CIRCUIT AND METHOD FOR CORRECTING POWER FACTOR, CONVERTER DEVICE THEREOF

CROSS-REFERENCE TO RELATED APPLICATION(S)

This application claims the benefit under 35 USC 119(a) of Korean Patent Application No. 10-2015-0010451 filed on Jan. 22, 2015 in the Korean Intellectual Property Office, the entire disclosure of which is incorporated herein by reference for all purposes.

BACKGROUND

1. Field

The following description relates to a power factor correction circuit. The following description also relates to a power factor correction circuit and a related method for simplifying a circuit and improving a power factor and Total Harmonic Distortion (THD) by changing a reference signal in real time to fit to an input signal in consideration of only the frequency and phase information of the input signal, when the input signal that is inputted to a converter changes. The following description also relates to a corresponding converter.

2. Description of Related Art

A converter receives input power and supplies required power to a load. The type of the voltage supplied to the input power is AC power and the type of the current supplied to the load is DC power. The current flowing through the load is similar to the current of the input power, so a phase difference is generated between the voltage and the current of the input power and a reactive power loss is generated accordingly. The reactive power loss decreases a power factor. Here, the power factor is the ratio of the real power that is used to do work and the apparent power that is supplied to the circuit.

Because of this issue, it is useful to reduce the phase difference between the voltage and the current of input power in order to improve a power factor. By improving the power factor, less power is lost due to the use of the converter. Also, because the current of input power is influenced by the current flowing through a load, when the current supplied to the load has a frequency and a phase that are similar to those of the voltage of the input power, the phase difference between the current and the voltage of the input power is potentially reduced. For example, one of the factors that reduce an efficiency of power transmission from a power plant is an increase in reactive power due to a phase difference that occurs between voltage and current. Accordingly, the power factor is improved when the phase difference between the voltage and the current of power is sufficiently reduced. That is, the smaller the phase difference between voltage and current, the larger the Power Factor Correction (PFC) is, and accordingly, the larger the phase difference, the smaller the PFC.

Additionally, the current of input power has to have a sine wave as its form in order to improve THD. That is, switching of a power switch of a converter may interfere with other devices. As a result, it is advisable that the harmonic components of the current of input power are small in order to minimize the interference, as discussed above. Furthermore, an index that numerically shows the amount of harmonic components is the THD and it is required to be close to a sine wave having a single frequency in order to reduce THD during operation.

Accordingly, it is useful for the current supplied to a load to have a sine wave characteristic, with a frequency and a phase that are similar to those of the voltage of input power, in order to improve a power factor and THD.

Many alternative correction circuits for improving a power factor and THD have been proposed. For example, in one alternative correction circuit, an approach is used in which it is attempted to improve a power factor and THD by generating an internal signal by using information matched with the phase and frequency information of an input signal.

However, in this alternative correction circuit, a reference signal is produced by calculating the period of an input signal and then generating a clock signal corresponding to the calculated period. Accordingly, it is difficult to generate a reference signal having accurate phase information according to issues that arise when calculating the period of the input signal.

Further, in the alternative correction circuit, the alternative correction circuit uses a process of converting input voltage into current at a predetermined level and then converting the current back into voltage. Accordingly, the alternative correction circuit also encounters the issue that it is complicated to generate a reference signal and there is a requirement for a precise sensing circuit to be able to successfully perform the converting.

In the alternative correction circuit, a reference signal is generated on the basis of only the information for one approximated period, in which the reference signal is generated to fit to the previous frequency and then applied to the next period. Accordingly, in this approach, the reference signal is based on the information of the previous period, and thus when the frequency of the present period changes, an error is generated due to the discrepancy that results from the difference between the reference signal as generated and the reference signal that would correspond to the changes that occur. Accordingly, distortion is generated in the signal, corresponding to the error.

Further, in the alternative correction circuit, a clock signal is used, as described above, to generate a reference signal. However, a clock generator for generating a clock signal calculates one period of an input signal, as discussed above, and generates a programmed sine wave corresponding to the period, accordingly. Therefore, when an input signal is not a sine wave, distortion is necessarily generated between the input signal and a reference signal generated on the basis of a clock signal, due to the imperfect modeling of the input signal using the generated sine wave.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present examples are directed to providing a power factor correction circuit for improving a power factor by changing a reference signal in real time to be fit to an input signal that is inputted to a converter, as the input signal changes, and a corresponding converter of the circuit.

Further, the present examples reduce the existing chip size to a power factor correction circuit and improve a power factor and THD.

Further, the present examples minimize distortion between an input signal and a reference signal, even if an input signal is not a sine wave.

In one general aspect, a power factor correction circuit includes a power switch configured to adjust an output voltage in accordance with an input voltage, a sensor configured to sense a sensing voltage on the basis of a value of a current flowing into the power switch, a reference signal generator configured to receive the sensing voltage and to generate a reference signal; and a power factor correction controller configured to receive the reference signal and the sensing voltage and to output a gate-on signal to turn on and turn off the power switch.

The reference signal generator may further include a detector configured to detect a turn-on time of the gate.

The detector may detect a predetermined first time and a second time that is a same gate-on time as the first time.

The first time and the second time may be symmetric to each other.

The reference signal generator may sample a peak signal of the sensing voltage, in response to a first time being detected.

The peak signal of the sensing voltage that is sampled may be maintained until a second time is detected.

The second time may be the same duration as the first time.

The reference signal generator may sample and hold the sensing voltage during a predetermined first gate-on maintaining time and a second gate-on maintaining time that is symmetric to the first gate-on maintaining time.

In another general aspect, a converter includes a reference signal generator configured to receive a sensing voltage of a power switch and to generate a reference signal, and a power factor correction controller configured to receive the reference signal and the sensing voltage and to generate and output a gate-on signal for the power switch, wherein the reference signal generator generates a reference signal while maintaining a peak signal of the sensing voltage during a first time in which a gate turn-on period of the power switch is set to a desired time and a second turn-on time that is the same as the first time are detected.

In another general aspect, a power factor correction method includes checking a sensing voltage according to an input voltage by means of a power factor correction circuit, detecting a predetermined first time while the sensing voltage is checked, sampling the sensing voltage in response to a first time being detected, and maintaining the sensing voltage until a second time the same as the first time is detected.

The first time and the second time may be gate turn-on maintaining times for the power switch and may have the same length.

The sensing voltage may increase until the first time is detected, and the sensing voltage may decrease after the second time is detected.

The gate turn-on maintaining time may decrease when the sensing voltage increases, and the gate turn-on maintaining time may increase when the sensing voltage decreases.

In another general aspect, a power factor correction circuit includes a sensor configured to sense a sensing voltage on the basis of a value of a current flowing into a power switch that is configured to adjust an output voltage in accordance with an input voltage, and a power factor correction controller configured to receive a reference signal and the sensing voltage and to output a gate-on signal to turn on and turn off the power switch, wherein the reference signal is generated by a reference signal generator configured to receive the sensing voltage and to generate a reference signal.

The reference signal generator may further include a detector configured to detect a turn-on time of the gate.

The detector may detect a predetermined first time and a second time that is a same gate-on time as the first time.

The first time and the second time may be symmetric to each other.

The reference signal generator may sample a peak signal of the sensing voltage, in response to a first time being detected.

The peak signal of the sensing voltage that is sampled may be maintained until a second time is detected.

The second time may be the same duration as the first time.

The reference signal generator may sample and may hold the sensing voltage during a predetermined first gate-on maintaining time and a second gate-on maintaining time that is symmetric to the first gate-on maintaining time.

As described above, the power factor correction circuit according to the present examples and the corresponding converter have the following effects.

According to the examples, when an input signal inputted to a converter is changed, a sensing voltage is sensed and a reference signal is changed to correspond to the type of an input frequency in real time.

Accordingly, power factor correction and THD are sufficiently improved even without using a specific control circuit in the converter. As a result, robust performance is obtained using a simpler approach.

Further, since the circuit is simplified, the size of a semiconductor chip is accordingly reduced. As the size is able to be reduced, the entire size of the device is able to be reduced, so it is possible to manufacture portable devices with a more portable size and reduce the manufacturing costs, as well.

Further, since a reference signal is generated by sampling and holding sensing voltage of input signal at a predetermined point of time, the present examples are applicable not only to a linear sine wave, but also to other stepped waveforms, so it is possible to minimize distortion using the approach used in examples, even in non-sine waves.

BRIEF DESCRIPTION OF THE DRAWINGS

FIG. 2 is a diagram illustrating a sensing voltage waveform when the power switch illustrated in the example of FIG. 1 is turned on.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A characteristic technical concept of the present example is to change a reference signal in real time to fit to a changed input signal and then supply it to a load, and to thereby improve a power factor and Total Harmonic Distortion (THD).

Examples of a power factor correction circuit and a corresponding converter of the power factor correction circuit according to the present examples are described hereafter in further detail with respect to the accompanying drawings.

Figure 1:
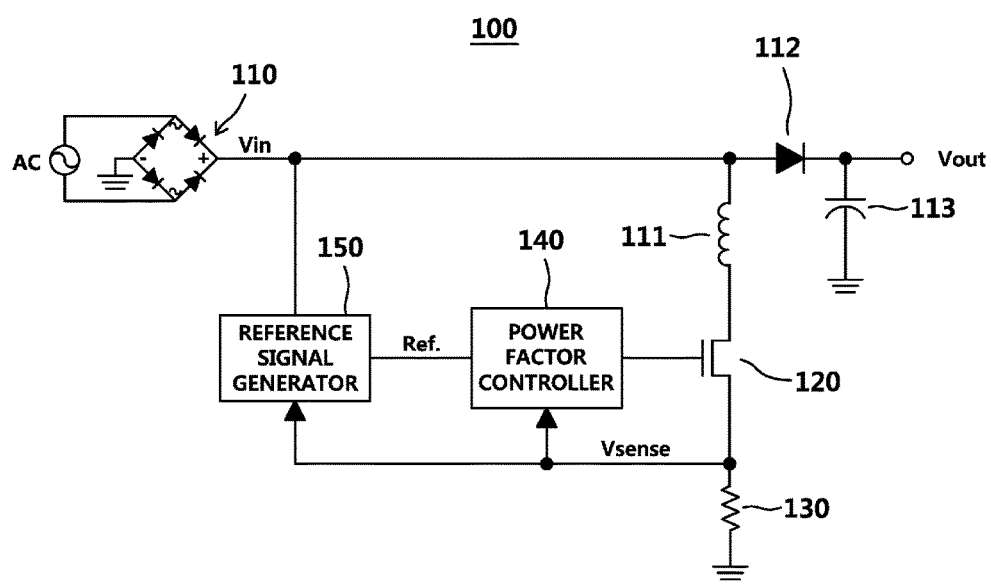
FIG. 1 is a block diagram illustrating a power factor correction circuit according to an example.

FIG. 1 is a block diagram illustrating a power factor correction circuit according to an example.

As illustrated in the example of FIG. 1, a power factor correction circuit 100 includes a bridge diode 110 generating an input voltage Vin by wave-rectifying AC power inputted from the outside of the power factor correction circuit 100.

An inductor Lm 111 and anodes of a diode D 112 are connected to an output terminal of the bridge diode 110. An input current corresponding to the input voltage Vin flows through the inductor Lm 111. Also, a capacitor C 113 is connected to a cathode of the diode D 112.

In the example of FIG. 1, a drain of a power switch 120 is connected to the other terminal of the inductor Lm 111. The power switch 120 controls current flowing into the inductor Lm 111. When the power switch 120 is turned off, the capacitor C 113 is charged by the current flowing through the inductor Lm 111 and accordingly generates an output voltage. In an example, the power switch 120 is an N-channel Metal Oxide Semiconductor Field Effect Transistor (NMOSFET).

In this example, a sensor R 130 is connected to a source of the power switch 120. The other terminal of the sensor 130 is grounded. The sensor 130 senses the voltage of an input signal. In this example, a resistance element or resistor is used for the sensor 130. However, any sensor element can be used, as long as it performs the function of sensing voltage on the basis of the value of current flowing through the power switch 120.

A power factor correction controller 140 is connected to a gate of the power switch 120. The power factor correction controller 140 receives a reference signal Ref that is generated by a reference signal generator 150, as is described further below, senses a voltage Vsense that is sensed by the sensor 130 and generates, and outputs a gate-on pulse signal for transmission into the power switch 120. That is, the power factor correction controller 140 controls timing during which a gate is turned on and off in accordance with the inclination of the sensing voltage Vsense. According to the examples, the gate-on time is controlled to be long in a section with a low reference signal, but is controlled to be short in a section with a high reference signal. Alternatively put, the gate-on time gradually decreases in a section in which the reference signal increases, but the gate-on time gradually increases in a section in which the reference signal decreases. Furthermore, according to the example, the gate-on time is maintained to be constant in a section in which the sensing voltage Vsense is sampled and held.

Also, the reference signal generator 150 receives a sensing voltage Vsense and generates a corresponding reference signal Ref. The reference signal generated by the reference signal generator 150 is controlled so as to correspond with the relevant sensing voltage Vsense. Thus, when the sensing voltage Vsense increases, the reference signal Ref also increases, but when the sensing voltage Vsense decreases, the reference signal Ref also decreases. Additionally, the reference signal Ref has a constant value in some sections, regardless of an input signal.

The sections in which the reference signal Ref is constant are potentially determined using the following method.

For example, there is a scenario in which the gate-on time is used. That is, the time period during which a gate is turned on is potentially used as time information calculated as a time interval. Such time information is determined in advance. Accordingly, when a predetermined gate-on maintaining time value, that is, a time 1, is detected, sensing voltage Vsense is sampled and then held until a gate-on maintaining time, that is, a time 2, that is the same as the time 1 is detected. Accordingly, the points of times of the time 1 and the time 2 are symmetric. Alternatively, the peak value of the sensing voltage Vsense is used to provide similar information. For example, a predetermined first voltage is detected, the sensing voltage Vsense is sampled and then the sampled sensing voltage Vsense is held until a second voltage the same as the first voltage is detected.

Accordingly, the reference signal generator 150 uses a detector, not illustrated, that detects the gate-on time or the peak value of the sensing voltage, or alternatively is able to operate by using information from a detector. In the example, the detector is not described.

Next, the operation of the power factor correction circuit having the configuration described above is described.

Figure 2:
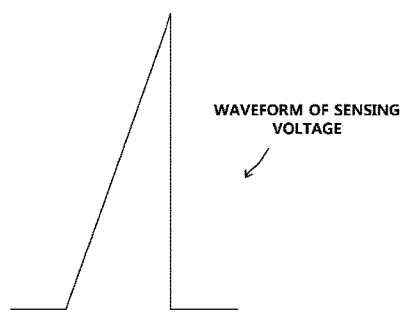
Figure 3:
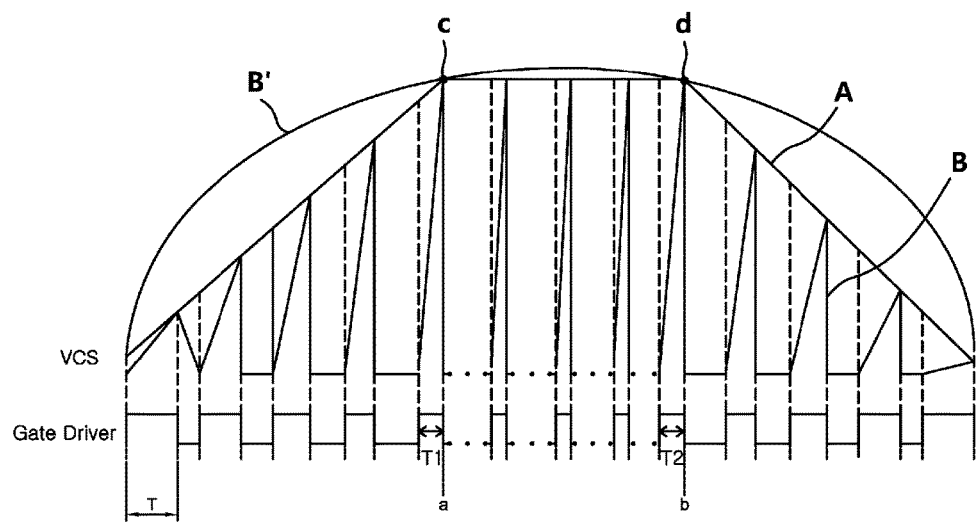
FIG. 3 is a diagram illustrating a reference signal for power factor correction from a reference signal generator.

The operation of the power factor correction circuit discussed above according to an example is described further with reference to FIGS. 2 and 3. FIG. 2 is a diagram illustrating a sensing voltage waveform when the power switch illustrated in the example of FIG. 1 is turned on and FIG. 3 is a diagram illustrating a corresponding reference signal for power factor correction from a reference signal generator. In FIG. 3, 'A' indicates a reference signal, 'B' indicates a sensing voltage, and 'B'' indicates an input voltage.

When AC power is supplied to a converter including the power factor correction circuit 100, the bridge diode 110 generates a corresponding wave-rectified input voltage Vin B'. As the power switch 120 is switched, the current flowing through the inductor Lm 111 accumulates in the capacitor C 113 and the generated input voltage Vin B' is supplied to a load through an output terminal Vout.

The current of input power that is inputted into the converter is influenced by the current flowing into the load. Accordingly, it is appropriate to reduce the phase difference between the voltage and the current of the input power.

To this end, the sensor 130 senses a voltage on the basis of the value of the current flowing into the power switch 120. Furthermore, the sensed voltage, which is subsequently referred to as sensing voltage B, is transmitted to the power factor correction controller 140 and the reference signal generator 150. The sensing voltage Vsense B is the voltage that is generated when the gate of the power switch 120 is turned on. Furthermore, the sensing voltage Vsense B has a predetermined inclination that is expressed by the following Equation 1 and has the waveform illustrated in FIG. 2.

$$\frac{Vin}{Lm} \times T \times Rcs = Vcs \quad\quad \text{Equation 1}$$

Herein, where Vin is an input voltage that is subject to being wave-rectified by the bridge diode 110, Lm is a voltage applied to an inductor, T is time, Rcs is the resistance value of a sensor R, and Vcs is sensing voltage. Accordingly, the sensing voltage depends on the input voltage, as specified in Equation 1.

Thus, when the input voltage Vin B' is supplied, the reference signal generator 150 that receives the sensing voltage Vsense from the sensor 130 generates a reference signal A. The reference signal A has an approximately similar inclination that is in accordance with the sensing voltage Vsense B. That is, with reference to FIG. 3, as the gate-on time T decreases, the sensing voltage Vsense B increases in correspondence with the inclination obtained from Equation 1. Thus, when the frequency of an input signal changes, the sensing voltage Vsense B changes accordingly and appropriately, and as a result, the reference signal generator 150 generates a reference signal A in order to fit to the sensing voltage Vsense B.

The reference signal generator 150 also detects whether the gate-on time becomes a predetermined time T1, thereby generating the reference signal A in accordance with the sensing voltage Vsense. The reference signal A also increases in accordance with an increase of the sensing voltage Vsense, until the first time T1 is detected.

When the reference signal generator 150 detects the predetermined first time T1, the peak signal, indicated as point c, of the sensing voltage Vsense B is initially sampled from the point a corresponding to a time of the detection. Accordingly, the reference signal A maintains a predetermined voltage. That is, after point c, the reference voltage A is maintained at a predetermined level regardless of the input voltage.

The reference signal generator 150 continues to check the gate-on time, as it maintains the reference signal A at a predetermined level.

Thereafter, when a second time T2 that has a gate-on time that is the same as the first time T1 is detected to have a decrease of the input signal, the sensing voltage Vsense B starts to decrease from the corresponding point d of time. Accordingly, the reference signal generator 150 also decreases the reference signal A, corresponding to the decrease of the sensing voltage Vsense B. However, when the second time T2 is not detected, the reference signal A maintains the level during the time between points c and d.

When the reference signal generator 150 changes the reference signal A with an appropriate change of the sensing voltage Vsense B, the power factor correction controller 160 controls turning on and off of the power switch 120 in consideration of the sensing voltage Vsense B.

As described above, the present examples are able to detect and sense a sensing voltage using the change of the gate turn-on time of the power switch for a change in input signal and generate a reference signal to fit to the sensing voltage.

Furthermore, when the sensing voltage reaches a predetermined point of time in accordance with a predetermined gate turn-on time, the sensing voltage is sampled and held, so that the reference signal is maintained regardless of the input signal. Thus, the sampling and holding of the reference signal is continued, until a turn-on time that is the same as the gate turn-on time is detected.

Figure 4:
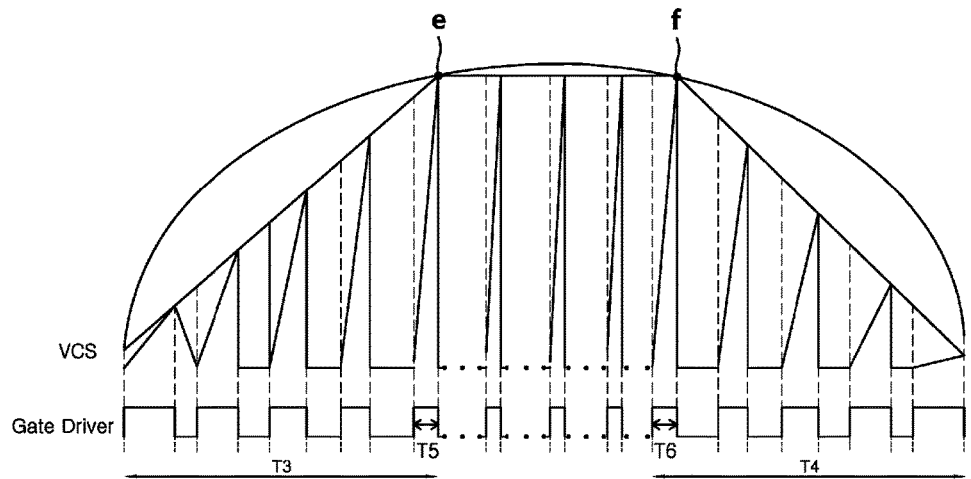
FIG. 4 is a diagram illustrating a reference signal generated by the power factor correction circuit illustrated in FIG. 1, according to an example.

The present examples are also able to change a reference signal to fit to an input signal in an alternative way. This alternative scenario refers to FIG. 4, which is a diagram illustrating another approach to providing a reference signal generated by the power factor correction circuit illustrated in the example of FIG. 1, according to an example. FIG. 4 illustrates a case of an approach using the peak value of sensing voltage Vsense, as described above.

Referring to FIG. 4, when the sensor 130 senses voltage inputted by turning on and off of the power switch 120, the corresponding sensed sensing voltage is illustrated in the waveform, as illustrated in FIG. 2 that has a predetermined inclination modeled by Equation 1.

Then, the reference signal generator 150 generates a reference signal in accordance with the inclination of the sensing voltage, as discussed above. The sensing voltage increases during a predetermined period T3 and the reference signal also accordingly increases.

Thereafter, the reference signal generator 150 samples and maintains a first peak voltage corresponding to a gate turn-on period T3 at the point of time where the predetermined period T3 ends. That is, by maintaining the first peak voltage detected at the point 'e' of time as shown in FIG. 4, a reference signal having a constant magnitude is outputted. Such a reference signal is maintained until a second peak voltage having the same value as the first peak voltage at the point 'e' of time is detected. For example, the reference signal is maintained till a point 'f' of time occurs, as shown in FIG. 4. In this example, the reference signal is maintained regardless of a change of the input voltage during the period, until the first peak voltage and the second peak voltage the same as the first peak voltage are both detected.

When the point 'f' of time passes, the reference signal then uniformly decreases with the sensing voltage for a predetermined time T4.

As described above, in another example, it is found that sensing voltage is sensed using the change of the gate turn-on time of the power switch with a change in input signal and a reference signal is generated to appropriately fit to the sensing voltage.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power factor correction circuit comprising:
   a sensor configured to sense a sensing voltage on the basis of a value of a current flowing into a power switch that is configured to adjust an output voltage in accordance with an input voltage obtained by wave-rectifying an alternating current (AC) power; and a power factor correction controller configured to receive a reference signal and the sensing voltage and to output a gate-on signal to turn on and to turn off the power switch, wherein the reference signal is generated by a reference signal generator configured to receive the sensing voltage and to generate a reference signal.

2. The power factor correction circuit of claim 1, wherein the reference signal generator further comprises a detector configured to detect a turn-on time of the gate.

3. The power factor correction circuit of claim 2, wherein the detector detects a first time and a second time that is a same gate-on time as the first time.

4. The power factor correction circuit of claim 3, wherein the first time and the second time are symmetric to each other.

5. The power factor correction circuit of claim 1, wherein the reference signal generator samples a peak signal of the sensing voltage, in response to a first time being detected.

6. The power factor correction circuit of claim 5, wherein the peak signal of the sensing voltage that is sampled is maintained until a second time is detected.

7. The power factor correction circuit of claim 6, wherein the second time is a same duration as the first time.

8. The power factor correction circuit of claim 1, wherein the reference signal generator samples and holds the sensing voltage during a first gate-on maintaining time and a second gate-on maintaining time that is symmetric to the first gate-on maintaining time.

9. A converter comprising:
a reference signal generator configured to receive a sensing voltage of a power switch and to generate a reference signal; and
a power factor correction controller configured to receive the reference signal and the sensing voltage and to generate and output a gate-on signal for the power switch,
wherein the reference signal generator generates the reference signal while maintaining a peak signal of the sensing voltage during a first time in which a gate turn-on period of the power switch is set to a desired time and a second turn-on time that is the same as the first time are detected.

10. A power factor correction method comprising:
checking a sensing voltage according to an input voltage by means of a power factor correction circuit;
detecting a first time while the sensing voltage is checked;
sampling the sensing voltage in response to the first time being detected; and
maintaining the sensing voltage until a second time the same as the first time is detected.

11. The method of claim 10, wherein the first time and the second time are gate turn-on maintaining times for the power switch and have a same length.

12. The method of claim 11, wherein the sensing voltage increases until the first time is detected, and the sensing voltage decreases after the second time is detected.

13. The method of claim 12, wherein the gate turn-on maintaining time decreases when the sensing voltage increases, and the gate turn-on maintaining time increases when the sensing voltage decreases.

* * * * *